United States Patent [19]

Urbigkeit

[11] Patent Number: 5,596,470
[45] Date of Patent: Jan. 21, 1997

[54] FAULT CURRENT PROTECTION CIRCUIT FOR AN AUXILIARY DEVICE IN A DIGITAL TELEPHONE SYSTEM

[75] Inventor: Frank Urbigkeit, Munich, Germany

[73] Assignee: Siemens Aktiengesellschaft, Munich, Germany

[21] Appl. No.: 505,660

[22] Filed: Jul. 21, 1995

[30] Foreign Application Priority Data

Aug. 1, 1994 [DE] Germany .................. 44 27 207.3

[51] Int. Cl.$^6$ ........................................ H02H 3/20
[52] U.S. Cl. ...................... 361/91; 361/115; 361/119
[58] Field of Search ...................... 361/91, 93, 111, 361/58, 56, 9, 11, 115, 119

[56] References Cited

U.S. PATENT DOCUMENTS 4,245,270  1/1981  Busby ........................ 361/58

Primary Examiner—Jeffrey A. Gaffin
Assistant Examiner—Stephen W. Jackson
Attorney, Agent, or Firm—Hill, Steadman & Simpson

[57] ABSTRACT

A fault current circuit apparatus for an auxiliary device connectable to telecommunications terminal devices, particularly a telephone set, in a digital telephone system is provided. In addition, signal lines for connecting electronic circuits in both devices are provided. The signal lines in the auxiliary device are connected via protective diodes to at least one ground line that carries a reference potential. A dc voltage is supplied to the auxiliary device from the telecommunications terminal device via a fault current protection circuit. In case of a fault caused by an inadmissible dc voltage potential on the ground line with reference to the signal lines, the dc voltage is shut off by the fault current protection circuit.

7 Claims, 1 Drawing Sheet

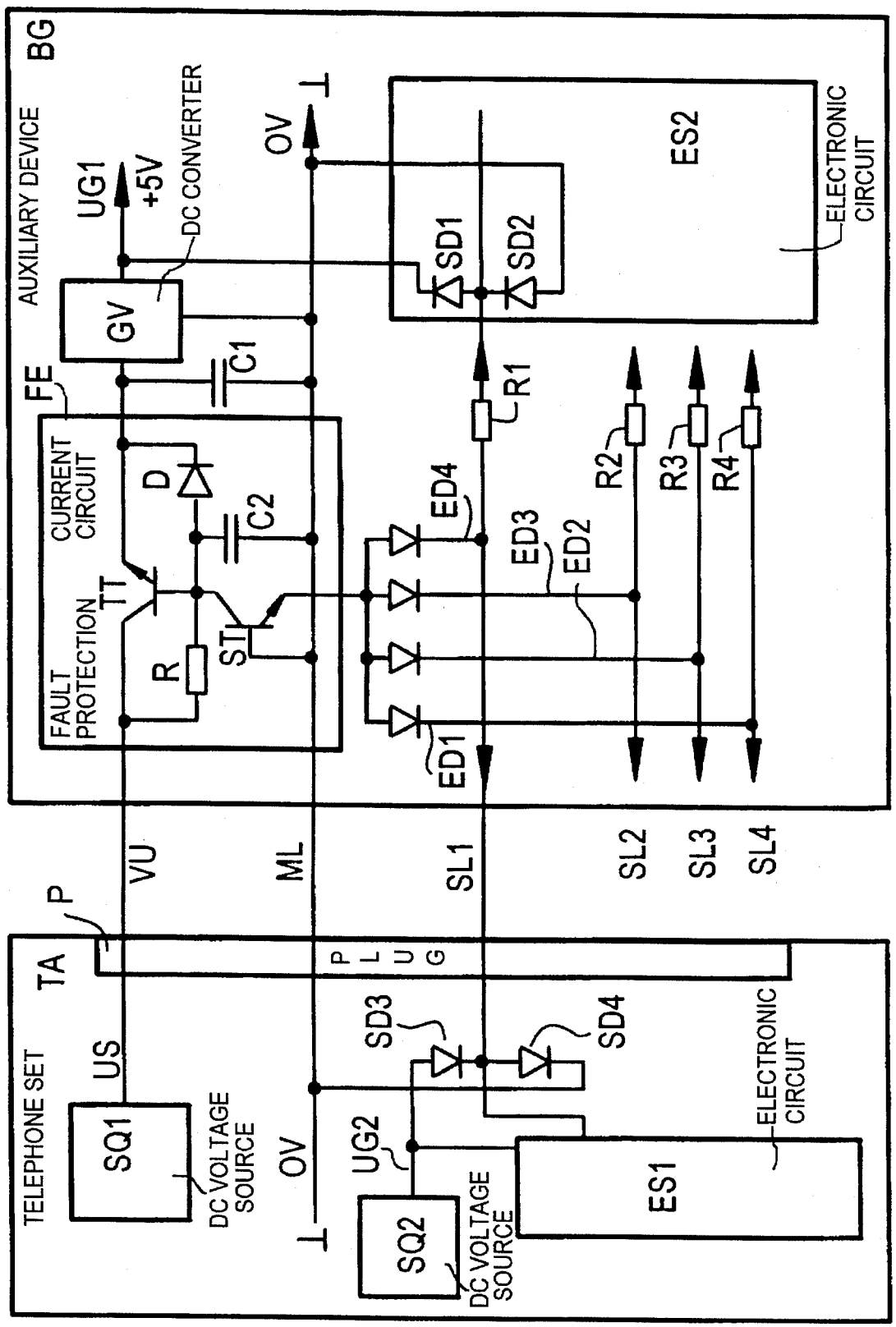

FAULT CURRENT PROTECTION CIRCUIT FOR AN AUXILIARY DEVICE IN A DIGITAL TELEPHONE SYSTEM

BACKGROUND OF THE INVENTION

1. Field of the Invention

The invention is directed generally to communication systems and more specifically to a fault current protection circuit for an auxiliary device for telecommunications terminal equipment.

2. Description of the Related Art

Name keys, electronic notebooks and similar devices are used in digital telephone systems. These auxiliary devices are connected to the basic equipment, i.e. to a telecommunication terminal device, via an interface. For example, telephone sets, fax devices and the like are such telecommunications terminal devices.

Such auxiliary devices generally have a separate dc voltage regulator that the telecommunications terminal equipment supplies with an unregulated dc voltage. The required supply voltage and a reference potential are supplied to the auxiliary devices via a pluggable connecting cable. In addition, the connecting cable contains signal lines for the connection of electronic circuits in the auxiliary device and in the basic equipment.

The risk of a non-uniform contacting due to different plug-in behavior exists given these plug-type connections. When plugging the auxiliary device to the basic equipment under voltage, the protective diodes, commonly referred to as clamping diodes, that are provided at the electronic circuits can be destroyed in the telecommunications terminal equipment and in the auxiliary device. Such a situation occurs when the reference potential is contacted later than the signal lines during plugging or when the reference potential is not contacted at all. In this case, a pseudo return line is formed via the signal lines. The fault current that flows leads to the break down of the protective diodes, which are only designed for an extremely light current load. After the destruction of the protective diodes, the electronic circuits such as microprocessors, integrated circuits and the like can also be damaged.

SUMMARY OF THE INVENTION

An object of the present invention is to provide a fault current protection circuit for an auxiliary device so that the electronic components in the telecommunications terminal equipment and in the auxiliary device are not destroyed even with a lack of, or a brief-duration lack of, a ground connection of the reference potentials.

This and other objects are inventively achieved in a fault current protection circuit apparatus for an auxiliary device connectable to a terminal device in a digital telephone system. A plurality of signal lines are provided for connecting the electronic circuits in both devices, wherein the signal lines in the auxiliary device are connected via protective diodes to at least one ground line that carries a reference potential. The fault current protection circuit apparatus comprises a fault current protection circuit in the auxiliary device; and a dc voltage source in the terminal device connectable to auxiliary device via the fault current protection circuit, such that when a fault of an inadmissible dc voltage potential on the ground line with reference to the plurality of signal lines occurs, the dc voltage source is shut off by the fault current protection circuit.

In the present invention, the fault current protection circuit in the auxiliary device shuts off the dc voltage supply when an inadmissible dc voltage on the ground line with reference to the signal lines is recognized.

The invention shall be set forth below with reference to an exemplary embodiment shown in the drawing.

BRIEF DESCRIPTION OF THE DRAWING

The FIGURE is a schematic diagram of an embodiment of the present invention.

DETAILED DESCRIPTION OF THE PREFERRED EMBODIMENTS

The sole FIGURE shows a block circuit diagram of components of an auxiliary device BG and of a telephone set TA necessary for an understanding of the invention.

The telephone set TA comprises a dc voltage source SQ1 that outputs a dc voltage US to the auxiliary device BG via a supply line VU. The supply line VU is connected to the collector of a switching transistor TT whose emitter is connected at the input side to a dc converter GV and, via a capacitor Cl, to a reference potential OV. The collector of the switching transistor TT is connected to the base thereof via a resistor R.

At its output side, the dc converter GV outputs a dc voltage UG1 of, for example, 5 V. The dc converter GV is connected to the reference potential OV. The reference potentials OV of the telephone set TA and of the auxiliary device BG are connected to one another via a ground line ML.

The telephone set TA and the auxiliary device BG comprise electronic circuits ES1 or, respectively, ES2 that are connected to one another via signal lines SL1–SL4. The wiring of the signal line SL1 is set forth in greater detail below; the other signal lines SL2–SL4 are identically wired. The plurality of signal lines SL1–SL4 can also assume other values.

In the telephone set TA, the signal line SL1 is connected via a protective diode SD3 to the output side of a dc voltage source SQ2 and to a protective diode SD4 with the reference potential OV. The dc voltage source SQ2 outputs a dc voltage UG2. In the auxiliary device BG, the signal line SL1 is connected via a protective diode SD1 to the output side of the dc converter GV and is connected to the reference potential OV via a protective diode SD2. In addition, the supply line VU, the ground line ML and the signal lines SL1–SL4 are contacted to the telephone set TA with a plug P.

Inventively, the switching transistor TT is a component part of a fault current protection circuit FE. In addition to the resistor R at the switching transistor TT, the circuit FE contains a control transistor ST whose collector is connected to the base of the switching transistor TT, whose base is connected to the reference potential OV and whose emitter is connected to at least one of the signal lines SL1–SL4. In the illustrated exemplary embodiment, the emitter of the control transistor ST is connected to all four signal lines SL1–SL4 via decoupling diodes ED1–ED4.

When the auxiliary device BG is contacted via the plug P to the telephone set TA under voltage, then, given the lack, or brief-duration lack, of the connection of the reference voltage of the auxiliary device BG and the telephone set TA, the control transistor ST is switched conductive via its base terminal. As a result thereof, the switching transistor TT is shut off, so that further charging of the capacitor C1 is prevented. The circuit regulates itself such that the return current that flows via the protective diodes SD1 and SD2 or, respectively, via the protective diodes at the other signal lines SL2–SL4 places the control transistor ST into a two-point regulator behavior. Given the lack of a connection to ground of the reference potentials OV in the telephone set TA and in the auxiliary device BG, the dc voltage US for the auxiliary device BG is inventively shut off.

An admissible return current across the protective diodes (SD2) onto the signal lines SL1–SL4 can be set via resistors R1–R4 in the signal lines SL1–SL4 that are respectively arranged between the decoupling diodes ED1–ED4 and the electronic circuit ES2 in the auxiliary device BG.

The base of the switching transistor TT or, respectively, the collector of the control transistor ST can be connected to the reference potential OV via a capacitor C2. As a result thereof, a soft turn-on of the current is effected with the time-defining elements of resistor R and capacitor C2, as is a charge limitation for the capacitor C1 in case of malfunction.

The base of the switching transistor TT or, respectively, the collector of the control transistor ST can also be connected to the emitter of the switching transistor TT via a diode D polarized in the flow direction. The control transistor ST is less loaded in the case since the capacitor charge of the capacitor C1 acts opposite the flow direction of the diode D. This version is especially suitable for low-power switching transistors ST. As a result thereof, a surge load for the telephone set TA is also prevented, so that a synchronized telephone set TA is not negatively influenced when the auxiliary device BG is plugged.

A high-performance control transistor ST that quickly discharges the capacitor C1 is required in the version of the circuit without this diode D. This version of the circuit is to be preferably employed in those instances wherein the influencing time of the current in case of malfunction must be extremely short given highly sensitive electronic circuits, for example, ES2.

It should be understood that various changes and modifications to the presently preferred embodiments described herein will be apparent to those skilled in the art. Such changes and modifications may be made without departing from the spirit and scope of the present invention and without diminishing its attendant advantages. It is, therefore, intended that such changes and modifications be covered by the appended claims.

I claim:

1. A fault current protection circuit apparatus for an auxiliary device connectable to a terminal device in a digital telephone system having a plurality of signal lines for connecting electronic circuits in both devices, wherein the signal lines in the auxiliary device are connected via protective diodes to at least one ground line that carries a reference potential, the apparatus comprising:

a fault current protection circuit in the auxiliary device; and a dc voltage source in the terminal device connectable to said auxiliary device via said fault current protection circuit, such that when a fault of an inadmissible dc voltage potential on the ground line with reference to the plurality of signal lines occurs, said dc voltage source is shut off by said fault current protection circuit.

2. The fault current protection circuit apparatus according to claim 1, further comprising:

a capacitor charged by said dc voltage source arranged so that said capacitor can be discharged by said fault current protection circuit when a fault occurs.

3. The fault current protection circuit apparatus according to claim 1, further comprising:

a plurality of resistors in said plurality of signal lines constructed and arranged to limit a fault current.

4. The fault current protection circuit apparatus according to claim 1, further comprising:

a plug located on said terminal device providing connections between said terminal device and said auxiliary device for said at least one ground line and between said dc voltage source and said fault current protection circuit, and providing connections for said plurality of signal lines to connect the electronic circuits in said auxiliary device and said terminal device.

5. The fault current protection circuit of claim 1, further comprising:

a plurality of protective diodes connected between said emitter of said control transistor and said plurality of signal lines, respectively.

6. A fault current protection circuit apparatus for an auxiliary device connectable to a terminal device in a digital telephone system having a plurality of signal lines for connecting electronic circuits in both devices, wherein the signal lines in the auxiliary device are connected via protective diodes to at least one ground line that carries a reference potential, the apparatus comprising:

a fault current protection circuit in the auxiliary device including:
a switching transistor having a collector, a base and an emitter;
a control transistor having a base connected to the at least one ground line, said control transistor also having a collector connected to said base of said switching transistor and an emitter connected to the protective diodes;
a resistor connected at one end to said collector of said switching transistor and at another end to said base of said switching transistor and said collector of said control transistor; and
a capacitor having a first end connected to said collector of said control transistor and having a second end connected to the at least one ground line; and a dc voltage source in the terminal device connected to said collector of said switching transistor of said auxiliary device such that when a fault of an inadmissible dc voltage potential on the ground line with reference to the plurality of signal lines occurs, said dc voltage source is shut off by said fault current protection circuit.

7. The fault current protection circuit of claim 6, further comprising:

a diode connected to said emitter of said switching transistor at one end and to said first end of said capacitor at another end.

\* \* \* \* \*